Dec. 7, 1948.    R. LUCIEN    2,455,429
VEHICLE BODY
Filed May 11, 1944    4 Sheets-Sheet 1
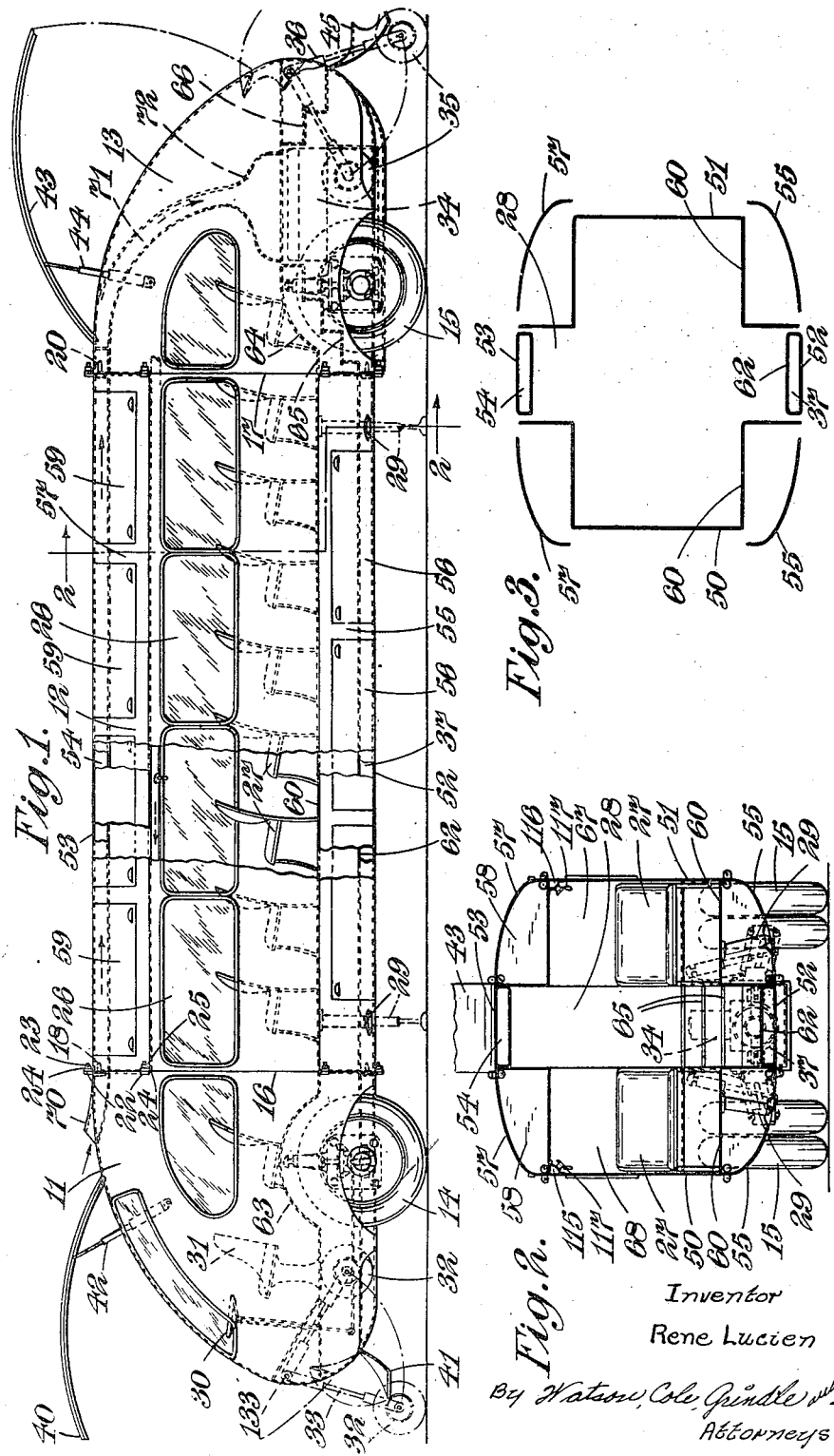
Inventor
Rene Lucien
By Watson, Cole, Grindle and Watson
Attorneys

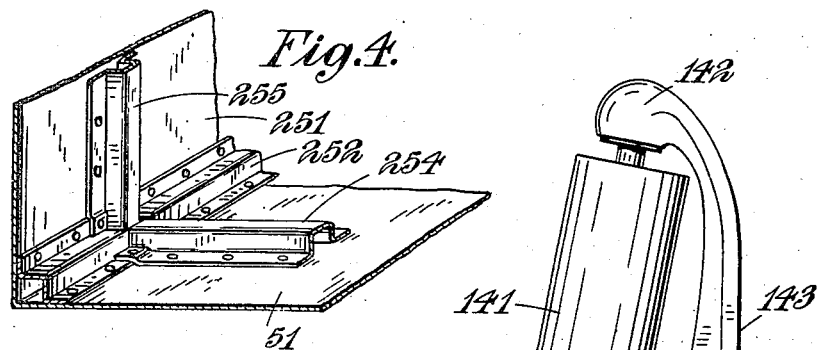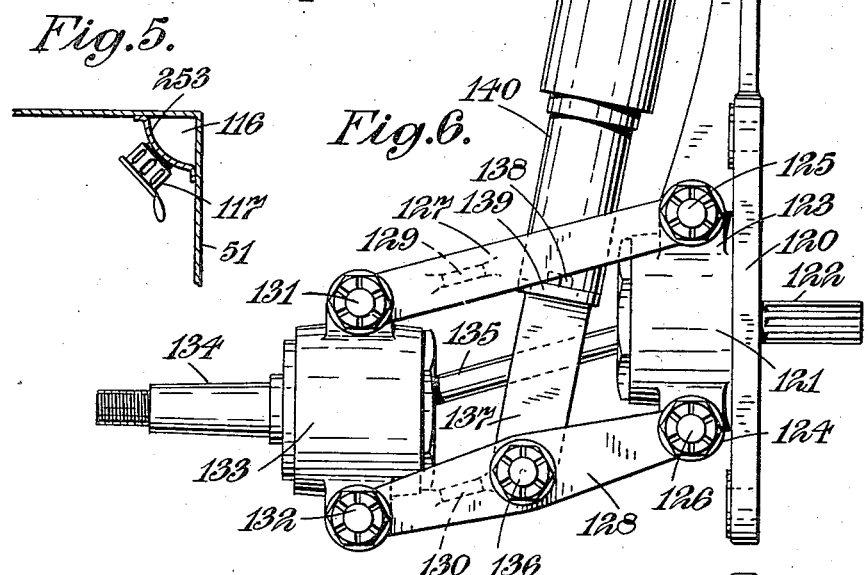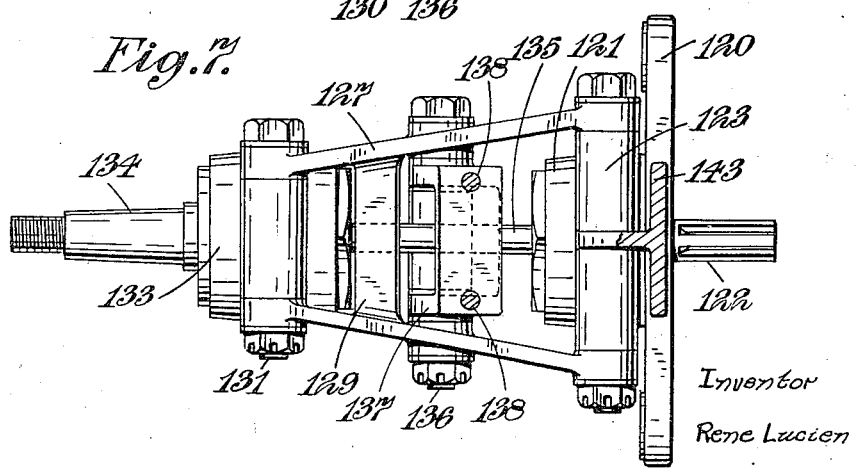

Dec. 7, 1948. R. LUCIEN 2,455,429
VEHICLE BODY
Filed May 11, 1944 4 Sheets-Sheet 3

Inventor
Rene Lucien
By Watson, Cole, Grindle & Watson
ATTORNEYS

Dec. 7, 1948.　　　　R. LUCIEN　　　　2,455,429
VEHICLE BODY

Filed May 11, 1944　　　　　　　　　　　　4 Sheets-Sheet 4

Inventor
Rene Lucien
By Watson, Cole, Grindle & Watson
Attorneys

Patented Dec. 7, 1948

2,455,429

UNITED STATES PATENT OFFICE 2,455,429

VEHICLE BODY

René Lucien, Farnham Common, England

Application May 11, 1944, Serial No. 535,128
In Great Britain March 15, 1943

3 Claims. (Cl. 296—28)

This invention comprises improvements in or relating to vehicles. It is a purpose of the present invention to provide a strong and rigid construction of vehicle. It is a further purpose of the invention to provide a construction which is adaptable for being built in sections for ready assembly.

According to one feature of the invention a vehicle comprises in combination a body in the form of a tube of cruciform cross-section which constitutes the main structural element of the vehicle and an engine, wheel mounting and control units each adapted for separate manufacture and attachment to the body.

Preferably each wheel unit is constituted by a base-plate and spring supporting means for an individual wheel, so that any wheel, complete with its supporting means and base-plate, can be readily attached to or detached from the cruciform tubular body, the place of attachment being in one of the angular recesses formed between the underside of one of the horizontal arms of the cross and the vertical arm.

With a vehicle constructed as described, entrance and exit are best provided by doorways in the centre at the front and rear ends.

The tubular body of the vehicle may be in several sections which are adapted to fit together end-to-end, the front section containing the controls, the central section containing seating accommodation or for other load and the rear section containing propulsive mechanism as described for example, in co-pending United States patent application Serial No. 535,127, filed May 11, 1944, now Patent No. 2,425,948, granted August 19, 1947.

The following is a description, by way of example, of one construction in accordance with the invention.

In the accompanying drawings:

Figure 1 is a side elevation of the vehicle with a portion of the centre broken away to show internal construction;

Figure 2 is a cross-section upon the line 2—2 of Figure 1;

Figure 3 is an "exploded" diagrammatic section illustrating the essential component parts of the body;

Figures 4 and 5 are details;

Figure 6 is a side elevation, and

Figure 7 is a plan of the suspension means for the rear driving wheels;

Figure 10:
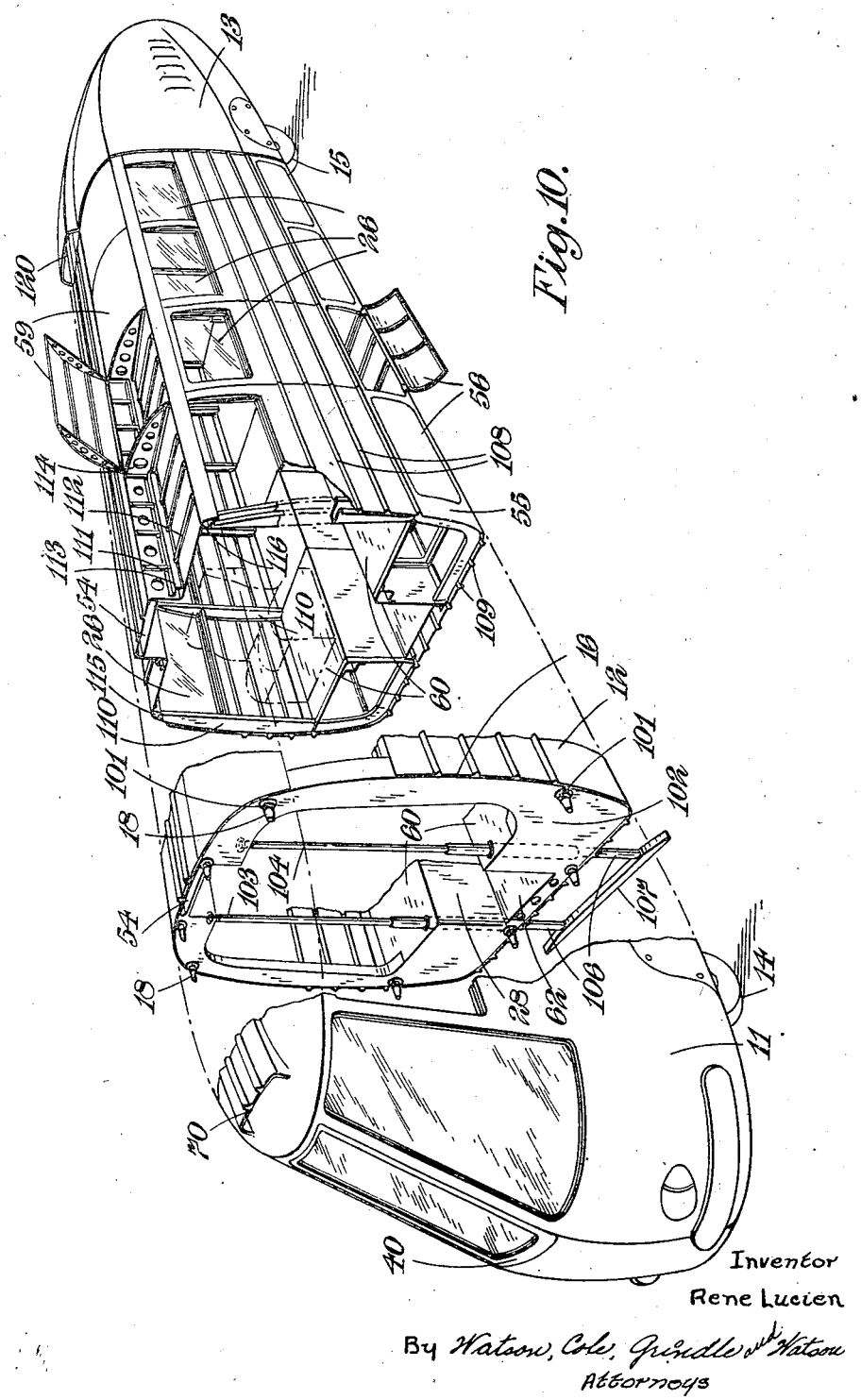
Figure 10 is a perspective view of a part of the body showing certain alternative features.

The vehicle comprises a front section 11, a central section 12 and a rear section 13. The front and rear sections are provided with wheels 14, 15 and are adapted to fit on the ends of the central sections by joints indicated at 16, 17, Figure 1. The joints comprise locating members 18 on the front section 11 to enter sockets in the central section 12 and locating members 20 on the central section to enter sockets on the rear section 13. In addition there are a number of lugs 22 on the front section which carry bolts 23 to enter lugs 24 on the central section, these bolts being capable of being secured by nuts 25. The connection is such as to be capable of transmitting tensile and compressive stresses at the top and bottom and to render the vehicle rigid as a whole. If the projection of the lugs 22, 24 is objected to, an alternative construction is shown in Figure 10 of the drawing in which the screw means for uniting the sections of the body are incorporated in the locating bolts, as hereinafter more fully described. In Figure 1, the central section is shown as a passenger-carrying section having side windows 26, upholstered seats 27 and a central passage 28 (Figure 2) from end to end. This section is provided with supporting jacks 29 at the four lower corners so that it can be temporarily supported from the ground at an appropriate height when disconnected from the end sections. The central section 12 will normally be parallel-sided and of the same height from end to end.

The wheels 14 of the front section are steerably mounted upon their axle and are connected to a steering wheel 30. The driver's seat 31 is located in this section. The front section 11 is curved so as to have a more or less streamlined nose and its sides are shaped to conform with the shape of the section 12 at the joint 16. In addition to the normal running wheels 14 a pair of castor wheels 32 are provided mounted on extensible struts 33 pivoted at 133. The struts 33 are constructed similarly to the shock absorbers of aircraft undercarriages and are provided with retracting means for retracting them into the section 11 or letting them down to the ground into the position shown in chain lines in Figure 1. The details of the struts and of the retraction mechanism may be similar to that adopted on aircraft and do not require to be described in connection with the present invention. The castor wheels 32 can be let down into contact with the ground to support the nose end of the section 11 when it is detached from the section 11 and to permit the section to be wheeled about in the detached condition.

The rear section 13 is similar in general shape to the front section but instead of containing steering mechanism it is provided with an engine (34 shown in dotted lines in Figure 1) connected through a gear box and differential to the rear driving wheels 15. The details of this arrangement may be, so far as the gear box and differential are concerned, constructed in accordance with ordinary automobile practice.

The rear section 13 also has a pair of castor wheels 35 mounted on shock absorber struts 36 similarly to the wheels 32 and struts 33 of the front section 11 and as before the wheels can be retracted into the section when desired. Engine and gear box controls are provided which can be coupled to connecting means passing through the central section 12 in a hollow space 37 in the floor of the central passageway 28 and thence to control devices at the driver's seat 31. Similarly brake control connections extend from the rear wheels 15 through the central section to a brake pedal in the section 11 by the driver's seat. The engine control and brake control connections are made readily detached at the joints 16, 17. For the purpose of these connections any known form of remote control mechanism can be adopted, either by connecting rods which can be united together by removable pins or right- and left-handed screw-threaded connections or by electrical control wires or by hydraulic pipe connections such, for example, as might be employed in a hydraulic distant control.

When the sections 11, 12 and 13 have been coupled together and the castor wheels 32, 35 have been retracted and the jacks 29 which support the central section 12 lifted clear of the ground, the vehicle is capable of travelling like an ordinary passenger coach, as may be desired. A door 40 for access to the interior is provided in the front of the section 11 in line with the central passage 28. The door 40 co-operates with a hinged step portion 41 and is shaped to conform with the rounded nose of the section 11. Preferably it is capable of being opened by a hydraulic jack 42 under the control of the driver.

The section 13 is provided with a somewhat similar curved door 43 capable of being opened by a hydraulic jack 44 and co-operating with a hinged step portion 45. Thus a passenger may enter at the front and leave at the back of the vehicle.

The body of the vehicle 12 is built up, as can be seen from Figure 3 of the drawing, from sheet metal sections which are constituted by side members 50, 51 united by an intermediate flat tubular member 52 at the bottom and a similar member 53 at the top. When united together these sections afford a rigid tubular body of which the member 52 provides the floor 62 with the hollow space 37 for the control connections enclosed within it. The member 53 constitutes the roof of the central corridor 28 and has an air duct 54 enclosed within it. The outline of the body is completed by curved sections 55 at the bottom which fill out the corners and afford storage space for luggage which is closed in by doors 56 (Figure 1). Similarly at the top there are curved roof sections 57 which enclose luggage space 58 to which access may be gained by hinged doors 59. The seats 27 rest on platforms 60 formed from the side members 51 of the tubular body, these platforms being at a higher level than the floor 62 provided by the upper part of the tubular bottom section 52.

The ends of the body section 12 are stiffened by transverse partitions 67, 68 so that only the central passage 28 extends right through the vehicle.

As can be seen from Figure 1 the end sections 11 and 13 contain platforms which constitute continuations of the platforms 60 but which are upcurved at 63, 64 so as to rise over the wheel. The platforms 64 in the rear section 13 rise to a height sufficient to cover the engine 34. The nose section 11 has a central floor to its passage which constitutes an extension of the floor 62 at the same level. In the rear section 13 the central passage is provided with steps 65, 66 to enable the floor to rise over the engine 34 and the steps 66 are continuous with the hinged steps 45 when the latter are lowered, as shown in Figure 1.

The air duct 54 through the roof of the central section 12 communicates with an air intake 70 in the front section 11 and it leads to a downwardly curved air passage 71 in the rear section 13. The air passage 71 is deflected laterally so as to avoid obstruction of the central passageway 28 and it delivers air to an air conditioner beneath a cowling 72 which is located in the rear section 13 on the air-intake side of the engine. The conditioner delivers air to the engine and also ventilation air to the vehicle, the latter through ducts 115, 116 and ventilators 117.

On the termination of a journey, or a portion thereof, the end sections 11, 13 can be detached from the central section 12 and they may be either coupled to another central section for the return journey or withdrawn for servicing or coupled together to constitute a short complete vehicle to return unloaded to its starting point, as more fully described in United States Patent Application Serial No. 535,127, filed May 11, 1944.

It will be observed that the central passageway 28 is a well defined feature of the construction which extends right through the vehicle and that it is marked out by the vertical sides of the portions 50, 51 of the tubular body 12 which connect the platforms 60 with the floor member 52 and which extend downwardly from the roof member 53. When the parts 50, 51, 52, 53 are united together and the partitions 67, 68 are provided the construction becomes exceedingly rigid and capable of transmitting the body stresses without a separate chassis.

This tubular main construction of the body is built up from light-alloy sheet metal and it will be observed, as viewed in cross-section, it is cruciform. The whole of the parts can readily be built up in a works of the kind in which light sheet metal work is carried on, such as, for example, aircraft body works. The remaining portions of the vehicle, namely the propelling mechanism of the wheels are necessarily of a construction which requires castings, forgings and machining operations and which is naturally adapted to be manufactured in works of a different type, but these other parts are made in unit form for easy attachment, one by one, to the body. These facilitate assembly and also repair.

Each of the wheels is independently sprung.

The cruciform tubular form of construction already described for the section 12 is continued forwardly into the nose 11 and rearwardly into the rear section 13 and the before referred to vertical walls which are united to the floor 52 form attachment panels for the suspension of the front and rear wheels 14, 15. The suspension of the rear wheels is shown in detail in Figures 6 and 7. Here a plate 120 which supports the suspension is adapted to be bolted to the aforesaid vertical walls. On its outer face it carries a large bearing boss 121 in which is a bearing for a driving shaft 122 which is castellated and is adapted to slide into a hollow internally castellated driving member on the gear box of the engine 34. Thus by unbolting the plate 120, the driving shaft 122 can be drawn out and the whole of the rear wheel suspension on that side of the vehicle will come away as one unit.

Above the boss 121 is a transverse lug 123 and below it is a second similar transverse lug 124. Through these lugs pass hinge pins 125, 126 which support upper and lower suspension links 127, 128. As can be seen from the plan, Figure 7, the links 127 are double-sided and the sides are united by a web 129. A similar web 130 unites the sides of the link 128. The ends of the links 127, 128 carry hinge pins 131, 132 which support a bearing boss 133. Supported on ball or roller bearings in the boss 133 is a stub axle 134. The stub axle 134 is connected by a universal joint located in the boss 133 to a transmission shaft 135 and the transmission shaft 135 is connected by a universal joint located in the boss 121 to the driving shaft 122.

The lower link 128 is spanned from side to side by a pivot pin 136 and the pivot pin supports a fork 137 which straddles the shaft 135. The fork is bolted by bolts 138 to a head 139 on the lower end of the piston rod 140 of an oleo-pneumatic shock absorber 141. The shock absorber is supported at its upper end by a ball joint in a head 142 of a bracket 143 extending upwardly from the plate 120. It will be understood that the details of the universal joints referred to and of the shock absorber 141, including, of course, the appropriate inflation means for the absorber, do not, in themselves, form any part of the present invention and may be constructed in accordance with ordinary engineering practice.

By the means described the rear wheels are independently sprung and each wheel and the suspension mounting therefor is readily detachable from the vehicle as a whole. The wheels are, of course, mounted on appropriate hubs secured to the stub axles 134.

In like manner the front wheels 14 are independently sprung. The mounting, shown in Figures 8 and 9, comprises a plate 150 to be secured to the vertical wall rising from the floor level of the entrance behind the door 40 and beneath the upcurved portion 63 of the side platform in the front section 11. On the plate 150 are lugs 151, 152 which support pivot pins 153, 154 on which are hinged an upper link 155 and a lower link 156. As before the links are double-sided and the sides of the upper link 155 are united by a web 157, while the sides of the lower link are united by a web 158.

The outer ends of the links 155, 156 may carry pivot pins 159, 160 which support a forging 161 extending between the links. The forging 161 is ring-shaped with lugs at the top and bottom to embrace the pins 159, 160. It also carries forwardly projecting lugs 162, 163 and through these lugs there passes a vertical steering pin 164. On the steering pin there is located a forging 165 which carries a stub axle 166 for the support of the front wheel hub. The stub axle forging 165 has laterally projecting arms 167 on each side and the arms 167 are connected by ball joints 168 to steering rods 169. There are two steering rods and they extend parallel with each other and with the planes of the links 155, 156 through the aperture in the ring-shaped forging 161 to ball joints 170 on a cross bar 171 pivoted at 172 to an arm 173 extending upwardly from the lug 151 on the base plate 150. The hub of the cross bar 171 where it is pivoted to the arm 173 carries a steering arm 174. The steering arm passes through an aperture 175 in the base plate 150 and is provided with a ball joint 176 which will be located in the vehicle inside the vertical wall which extends upwardly from the floor of the central passage. The ball joint 176 is intended for connection by appropriate rod work and gearing to the steering wheel 30 already referred to. Disconnection of the steering at the ball joint 176 is easy and therefore the front wheel suspension can readily be removed from the vehicle as a whole unit on one side or, on the other as the case may be.

As with the rear wheel suspension, the lower link 156 carries a cross pin 180 on which is pivoted the head 181 of a piston rod 182. The piston rod 182 is bolted to a sliding member 183 of the shock absorber 184 similarly to the absorber 141 of Figure 6. The shock absorber 184 is connected by a ball joint 185 to a bracket 186 extending upwardly from the base plate 150.

Figure 11:
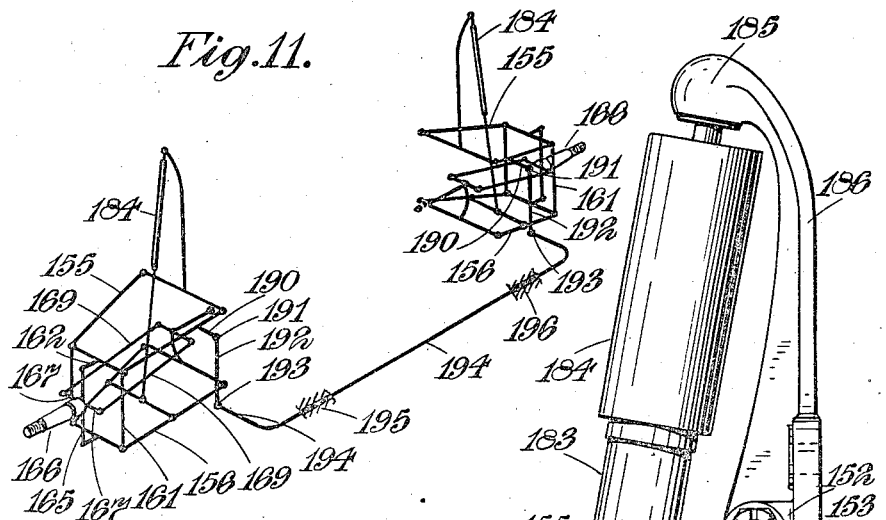
Figure 11 is a diagram of the linkwork of the suspension means for the wheels showing how the suspension means on opposite sides of the vehicle may be linked together to provide antirolling properties in the suspension.

The details of the construction of the sheet metal tubular body are not wholly shown in Figures 1 to 3. It will be appreciated that they are carried out in accordance with the ordinary principles of sheet metal cellular construction as commonly adopted for fuselages of aircraft and like cases. It is necessary that the corners of the side members 50, 51 of the tubular body should be appropriately strengthened and that the sheet should be properly stiffened. Some of these details are shown in Figures 4, 5 and 11 of the drawings. Figure 4 shows a portion of the upper part of the side member 51 at the corner where it is bent upwardly to provide a vertical wall 251 which joins the hollow roof member 53. Here the internal angle is strengthened by a longitudinal stiffener 252 which is of zigzag formation (as shown) in section. Similar stiffening members are applied at other corners. For example the air duct 116 already referred to is constituted by the outer side walls and by a stiffening member 253 (Figure 5).

In addition the plaform 60 and the floor of the upper luggage spaces 58 are stiffened by transverse bridge-section members 254 and the vertical walls by bridge-section members 255. The luggage spaces 58 are preferably subdivided by appropriate web members which connect the outer roof panels 57 with the vertical walls 251 and the horizontal portions of the luggage space together.

Similar web members are disposed in the bottom luggage spaces above the doors 56.

These and further details are shown in greater elaboration in Figure 10 which shows a vehicle slightly modified in shape as compared with Figure 1, but substantially of the same construction as is shown in that figure and in Figure 10 similar parts are lettered with the same reference numerals as the corresponding parts in the other figures. It will therefore not be necessary to describe the whole of the construction of this vehicle. The parts are shown broken away at several sections to indicate the internal construction and the following special features, most of which are obviously applicable to Figure 1, also are shown in the drawing:

At the joint 16, between the central section and the nose section 11 the conical locating members 18 are mounted so as to enter sockets in the nose section 11 and they are made rotatable. At the root portion of the locating members 18 they are screwthreaded externally as shown at 101 and the sockets in the nose section 11 are similarly screwthreaded. These locating members are mounted in a stiffening plate 102 which forms the front portion of the body section 12 and they have heads on the other side of the plate 102 by which they can be rotated. As a result, when the nose section 11 is positioned against the body section 12, on rotating the locating members 18, the two parts are screwed together and the external finish is flush instead of being marked by a number of lugs and nuts as previously described.

In this instance the supporting jacks for the central section 12 are made in pairs which are hidden in the base portions of standards 103, 104 located one each side of the central passageway 28. The lower movable portion of the supporting jacks is mounted on two rods 106 at each end which are united by a cross-bar 107. The crossbar is lowered by hydraulic pressure applied to the jacks by appropriate connections when the parts are to be disconnected from one another. A similar arrangement is provided at the other end of the body 12.

In order to stiffen the sides of the vehicle the sheet metal of these parts is longitudinally corrugated as indicated at 108. The metal of the bottom part of the vehicle may also be corrugated as shown at 109. At intervals along the length of the body between the windows 26 there are transverse frame members 110 which serve further to stiffen the construction and the luggage spaces are stiffened by ribs 111, 112, 113, and by brackets 114.

The air entry 70 is used to convey air to a conditioning plant located in the rear section 13 from which the air is redistributed to the interior of the vehicle by the conduits 115, 116 located in the top upper corners of the body above the seats.

Figure 8:
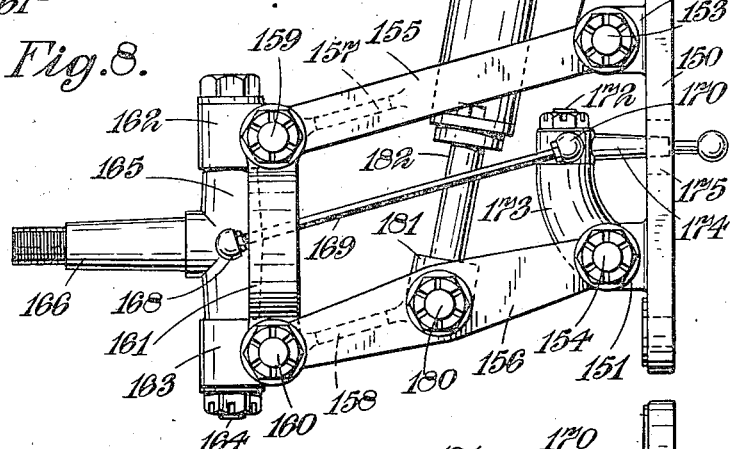
Figure 8 is a side elevation.
Figure 9:
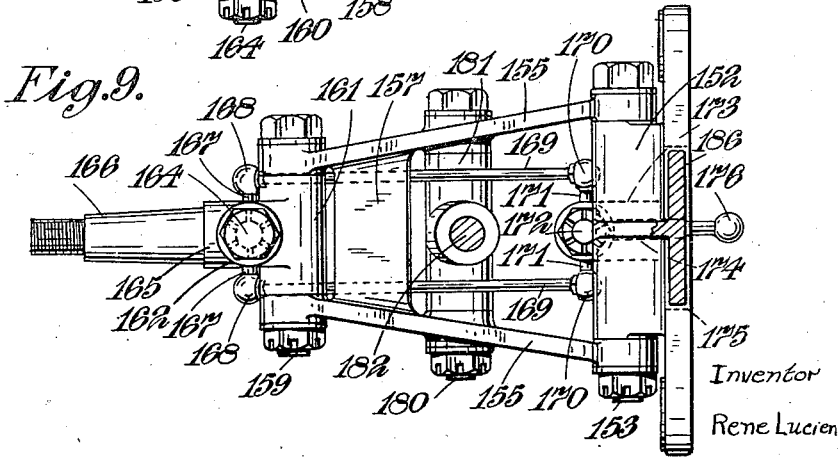
Figure 9 is a plan of the suspension means for the front steering wheels.

Figure 11 of the drawing shows a device which may be adopted to limit any tendency of the vehicle to roll while traveling. In this figure the links 155, 156 of the suspension of Figures 8 and 9 are shown in outline, connected to the ring-shaped member 161 and the steering member 162. The steering rods 169 are also indicated and the shock absorber 184. The corresponding parts of the suspension on the opposite side of the vehicle are also shown. The upper links 155 are, according to this figure, provided with lugs 190 which carry ball joints 191. Each of the ball joints 191 are connected by a link 192 to a second ball joint 193 and the ball joints 193 are carried on an anti-rolling lever 194 which is pivoted to the vehicle at 195, 196, and has two arms extending rearwardly to the ball joints 193. The anti-rolling lever 194 extends across the vehicle from side to side and is made of such diameter that it has a certain resilient yielding quality which permits the wheels to yield independently to a limited extent but in the event of a heavy rolling motion of the vehicle which would cause the suspension on one side to yield much more than the other, the anti-rolling device transmits stress from the side which is more compressed to the other side of the vehicle and therefore tends to limit the movement.

A similar connection between the suspension on the two sides can be applied at the rear of the vehicle, if so desired.

I claim:

1. A wheeled road vehicle having an elongated body shell constructed of sheet metal and comprising a main beam-like structural member in the form of a tube of cruciform cross-section for substantially its entire length, the supporting means for said body disposed adjacent the ends thereof leaving the long intermediate portion of the body unsupported except by the self-sustaining beam structure of the body itself, the vertical arms of the cruciform cross-section of the body enclosing a central passageway for the vehicle, and the laterally extending arms providing space for the pay load, the top and bottom walls of the central space provided by the vertical arm of the cruciform cross-section of the body being hollow and box-like in section to provide spaces extending substantially the length of the vehicle.

2. A wheeled multi-passenger bus or the like having an elongated body shell constructed of sheet metal and comprising a main beam-like structural member in the form of a tube of cruciform cross-section for substantially its entire length, the supporting means for said body disposed adjacent the ends thereof leaving the long intermediate portion of the body unsupported except by the self-sustaining beam structure of the body itself, the vertical arms of the cruciform cross-section of the body enclosing a central passageway for the vehicle wherein passengers may stand erect, and the laterally extending arms providing seating space of a much less height, the top and bottom walls of the central space provided by the vertical arm of the cruciform cross-section of the body being hollow and box-like in section to provide ducts extending the length of the vehicle.

3. A wheeled road vehicle having an elongated body shell constructed of sheet metal and comprising a main beam-like structural member in the form of a tube of cruciform cross-section for substantially its entire length, the supporting means for said body disposed adjacent the ends thereof leaving the long intermediate portion of the body unsupported except by the self-sustaining beam structure of the body itself, the vertical arms of the cruciform cross-section of the body enclosing a central passageway for the vehicle, and the laterally extending arms providing space for the pay load, the right angular recesses formed between the side walls of the lower downwardly extending vertical arm of the cruciform cross-section of the body and the lower walls of the laterally extending arms of the body cross-section providing convenient space for the disposition of said body supporting means, the top and bottom walls of the central space provided by the vertical arm of the cruciform cross-section of the body being hollow and box-like in section to provide spaces extending substantially the length of the vehicle.

RENÉ LUCIEN.

(References on following page)

REFERENCES CITED

The following references are of record in the file of this patent:

UNITED STATES PATENTS

| Number | Name | Date |
|---|---|---|
| 675,876 | Anderson | June 11, 1901 |
| 825,611 | Ostrander | July 10, 1906 |
| 912,840 | Graham et al. | Feb. 16, 1909 |
| 1,307,723 | Brown | June 24, 1919 |
| 1,479,426 | Brainerd | Jan. 1, 1924 |
| 1,636,505 | Fairbanks | July 19, 1927 |
| 1,711,881 | Fornaca | May 7, 1929 |
| 1,712,540 | Wright | May 14, 1929 |
| 1,822,775 | Henninger | Sept. 8, 1931 |
| 1,953,515 | Smith | Apr. 3, 1934 |
| 2,041,992 | Charles | May 26, 1936 |
| 2,071,592 | Thompson | Feb. 23, 1937 |
| 2,084,694 | Martin | June 22, 1937 |
| 2,093,859 | Austin | Sept. 21, 1937 |
| 2,128,930 | Fageol et al. | Sept. 6, 1938 |
| 2,157,075 | Grade | May 2, 1939 |
| 2,157,649 | Eksergian | May 9, 1939 |
| 2,173,973 | Leighton | Sept. 26, 1939 |
| 2,190,298 | Slack | Feb. 13, 1940 |
| 2,253,666 | Wagner | Aug. 26, 1941 |
| 2,268,502 | Browne | Dec. 30, 1941 |
| 2,294,363 | Brockway | Sept. 1, 1942 |
| 2,330,633 | Seyerle | Sept. 28, 1943 |
| 2,344,072 | Winkelmann | Mar. 14, 1944 |

FOREIGN PATENTS

| Number | Country | Date |
|---|---|---|
| 156,092 | Great Britain | Oct. 13, 1921 |
| 469,417 | Germany | Dec. 11, 1928 |
| 706,014 | Germany | May 15, 1941 |